Patented Jan. 9, 1945

2,367,058

UNITED STATES PATENT OFFICE 2,367,058

PYRIDINE-3-SULPHONAMIDE DERIVATIVES AND PROCESSES FOR THEIR PRODUCTION

Richard O. Roblin, Jr., Old Greenwich, and Richard C. Clapp, Stamford, Conn., assignors to American Cyanamid Company, New York, N. Y., a corporation of Maine No Drawing. Application July 31, 1942, Serial No. 453,107

10 Claims. (Cl. 260—290)

This invention relates to a new class of chemical compounds. More particularly it relates to the class of compounds represented by the following general formula:

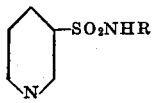

in which R represents a sulphur-containing heterocyclic group.

Some of the compounds of the present invention are bacteriostatic and hence may be useful for such purposes. They are also useful as intermediates in the preparation of other pharmaceuticals. In general, the compounds of the present invention may be prepared by reacting a pyridine-3-sulphonyl halide with an amino heterocyclic compound containing sulphur. In the reaction hydrogen halide is liberated, and it is therefore desirable where a good yield is to be obtained to provide a basic substance which will unite with the hydrogen halide evolved. This can be effected simply by carrying the reaction out in a suitable medium, such as acetone, isopropyl alcohol, tertiary butyl alcohol, dioxane, or the like, while adding sodium hydroxide or other alkali hydroxide. In some instances it may be possible to carry the reaction out in an aqueous medium. We generally prefer to carry the reaction out in a basic organic liquid, such as pyridine, triethylamine, quinoline, and the like.

The invention will be described more fully in conjunction with the following specific examples. It should be understood, however, that the examples are given by way of illustration only and the invention is not to be limited by the details set forth therein. The parts are by weight except in the case of liquids which are expressed in parts by volume.

EXAMPLE 1

*Pyridine-3-sulphonamidothiodiazole*

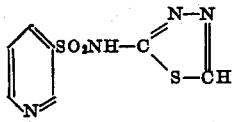

The pyridine-3-sulphonyl chloride from 3 parts of pyridine-3-sulphonic acid and 3.96 parts of phosphorus pentachloride is dissolved in 12 parts of dry pyridine. To the cooled solution 1.9 parts of 2-aminothiodiazole are then added in portions. The solution is warmed on the steam bath for 30 minutes and is then concentrated under reduced pressure. The dark residue is treated with 20 parts of cold water, the pyridine-3-sulphonamidothiodiazole remaining undissolved as a brown solid. It is purified by recrystallization from glacial acetic acid with the use of activated charcoal.

EXAMPLE 2

*Pyridine-3-sulphonamidothiazole*

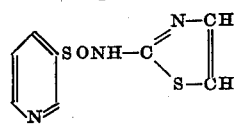

The pyridine-3-sulphonyl chloride from 3 parts of pyridine-3-sulphonic acid and 3.96 parts of phosphorus pentachloride is dissolved in 5.4 parts of dry pyridine. To the cooled solution 1.9 parts of 2-aminothiazole are then added in portions. The solution is warmed on the steam bath for 35 minutes, and 22 parts of water are then added. The pyridine-3-sulphonamidothiazole separates as a red-brown solid. This solid is dissolved in ammonium hydroxide, and the solution is treated with activated charcoal. The pyridine-3-sulphonamidothiazole is reprecipitated with 10% hydrochloric acid and is further purified by crystallization from glacial acetic acid with the use of activated charcoal.

In the foregoing examples pyridine-3-sulphonyl chloride was employed as the intermediate and is the preferred compound. However, instead thereof we may use pyridine-3-sulphonyl halides generally including pyridine-3-sulphonyl bromide.

For purposes of illustrating the present invention the sulphur-containing heterocyclic compounds employed as intermediates were 2-aminothiodiazole and 2-aminothiazole, these being preferred because of their cheapness and availability. Other amino heterocyclic compounds containing sulphur suitable for replacing those illustrated include 5-amino-1,2,4-thiodiazole, 3-amino-1,2,4-thiodiazole, 5-amino-1,2,3-thiodiazole, 4-amino-1,2,3-thiodiazole, 3-amino-1,2,5-thiodiazole, 2-amino-5-methyl-1,3,4-thiodiazole, 2-amino-5-phenyl-1,3,4-thiodiazole, 2-amino-4-methylthiazole, 2-amino-4-phenylthiazole, and the like.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. Compounds having the following general formula:

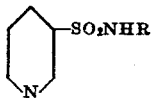

in which R represents a sulphur-containing heterocyclic group of the group consisting of thiazole radicals and thiodiazole radicals.

2. Compounds having the following general formula:

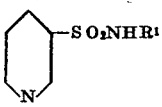

in which $R^1$ represents a thiazole group.

3. Compounds having the following general formula:

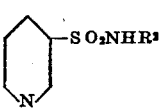

in which $R^2$ represents a thiodiazole group.

4. The compound 2-(pyridine-3-sulphonamido)-thiodiazole.

5. The compound 2-(pyridine-3-sulphonamido)-thiazole.

6. The process which comprises reacting a pyridine-3-sulphonyl halide with an amino-S-containing heterocyclic compound of the group consisting of aminothiazoles and aminothiodiazoles.

7. The process which comprises reacting a pyridine-3-sulphonyl halide with an aminothiazole to produce a pyridine-3-sulphonamidothiazole.

8. The process which comprises reacting a pyridine-3-sulphonyl halide with an aminothiodiazole to produce a pyridine-3-sulphonamidothiodiazole.

9. The process which comprises reacting pyridine-3-sulphonyl chloride with 2-aminothiazole to give 2-(pyridine-3-sulphonamido)-thiazole.

10. The process which comprises reacting pyridine-3-sulphonyl chloride with 2-aminothiodiazole to give 2-(pyridine-3-sulphonamido)-thiodiazole.

RICHARD O. ROBLIN, JR.
RICHARD C. CLAPP.